US012800373B2

(12) United States Patent
Pohl et al.

(10) Patent No.: US 12,800,373 B2
(45) **Date of Patent: *Nov. 17, 2026**

(54) METHOD FOR OPERATING A CORIOLIS MEASUREMENT DEVICE

(71) Applicant: Endress+Hauser Flowtec AG, Reinach (CH)

(72) Inventors: Johan Pohl, Freiburg (DE); Rémy Scherrer, Oberdorf (FR); Hao Zhu, Freising (DE)

(73) Assignee: Endress+Hauser Flowtec AG, Reinach (CH)

( * ) Notice: Subject to any disclaimer, the term of this patent is extended or adjusted under 35 U.S.C. 154(b) by 386 days.

This patent is subject to a terminal disclaimer.

(21) Appl. No.: 18/294,811

(22) PCT Filed: Jul. 22, 2022

(86) PCT No.: PCT/EP2022/070599

§ 371 (c)(1),
(2) Date: Feb. 2, 2024

(87) PCT Pub. No.: WO2023/011944

PCT Pub. Date: Feb. 9, 2023

(65) Prior Publication Data

US 2024/0344870 A1 Oct. 17, 2024

(30) Foreign Application Priority Data

Aug. 5, 2021 (DE) ..................... 10 2021 120 452.6

(51) Int. Cl.

| | |
|---|---|
| ***G01F 1/84*** | (2006.01) |
| ***G01F 25/10*** | (2022.01) |
| ***G01N 9/32*** | (2006.01) |

(52) U.S. Cl.

CPC .......... *G01F 1/8436* (2013.01); *G01F 1/8422* (2013.01); *G01F 1/8427* (2013.01); *G01F 1/8459* (2013.01); *G01N 9/32* (2013.01)

(58) Field of Classification Search

CPC ........ G01F 1/84; G01F 1/8422; G01F 1/8427; G01F 1/8431; G01F 1/8436; G01F 1/8459; G01F 15/001; G01F 25/10; G01N 9/32

See application file for complete search history.

(56) References Cited

U.S. PATENT DOCUMENTS 5,228,327 A 7/1993 Bruck
5,423,221 A * 6/1995 Kane ..................... G01F 1/8481 73/861.355

(Continued)

FOREIGN PATENT DOCUMENTS

WO 2020088837 A1 5/2020
WO 2021197764 A1 10/2021

*Primary Examiner* — Thien M Le
(74) *Attorney, Agent, or Firm* — Mark A. Logan; Endress+Hauser (USA) Holding, Inc.

(57) ABSTRACT

A method for operating a Coriolis measurement device comprises: recording the measured voltages from the sensors and creating an asymmetric sequence of values using the amplitudes of the measured voltages for the purpose of diagnosing the Coriolis measurement device; checking whether the asymmetric sequence of values satisfies at least one invalidity criterion; and creating a stabilized asymmetric sequence of values on the basis of the asymmetric sequence of values by replacing asymmetric measured values with substitute values. While an invalidity criterion is satisfied a last valid measured value of the asymmetric sequence of values is used as the current value of the stabilized asymmetric sequence of values, or the stabilized asymmetric sequence of values is set to a predetermined value, a first (Continued)

invalidity criterion being based on a scattering parameter of the asymmetric value exceeding a first limit value.

11 Claims, 3 Drawing Sheets

(56) References Cited

U.S. PATENT DOCUMENTS

| | | | | |
|---|---|---|---|---|
| 6,230,104 | B1 * | 5/2001 | Shelley | G01F 1/8431 702/56 |
| 7,337,084 | B2 | 2/2008 | Dutton | |
| 11,486,752 | B2 * | 11/2022 | Patten | G01F 15/024 |
| 2013/0228003 | A1 | 9/2013 | Bierweiler et al. | |
| 2014/0000383 | A1 * | 1/2014 | Keita | G01F 1/8404 73/861.19 |
| 2015/0204701 | A1 * | 7/2015 | Klicpera | G01M 3/00 137/624.11 |
| 2016/0076909 | A1 * | 3/2016 | Klicpera | G01F 15/0755 73/198 |
| 2016/0163177 | A1 * | 6/2016 | Klicpera | E03B 7/071 137/59 |
| 2018/0171281 | A1 * | 6/2018 | Ruetten | G01F 1/8413 |
| 2019/0170552 | A1 | 6/2019 | Dutton | |
| 2020/0116612 | A1 * | 4/2020 | Ruetten | G01F 1/8431 |
| 2020/0249063 | A1 | 8/2020 | Greco | |
| 2020/0393278 | A1 * | 12/2020 | Chatzikonstantinou | G01F 1/8422 |
| 2023/0168115 | A1 * | 6/2023 | Pohl | G01F 25/10 73/861.356 |
| 2026/0098751 | A1 * | 4/2026 | Morett | G01F 1/8436 |

* cited by examiner

METHOD FOR OPERATING A CORIOLIS MEASUREMENT DEVICE

CROSS-REFERENCE TO RELATED APPLICATIONS

The present application is related to and claims the priority benefit of DPMA Patent Application No. 10 2021 120 452.6, filed on Aug. 5, 2021 and International Patent Application No. PCT/EP2022/070599, filed on Jul. 22, 2022, the entire contents of which are incorporated herein by reference.

TECHNICAL FIELD

The invention relates to a method for operating a Coriolis measurement device for measuring a density and/or a mass flow of a medium flowing through a pipeline.

BACKGROUND

In Coriolis measurement devices, at least one measuring tube is excited to vibrate; see for example DE102016125537A1. A medium flowing through the measuring tube causes characteristic distortions of these vibrations. These vibrations are usually sensed by two sensors and evaluated by an electronic measuring/operating circuit. Due to manufacturing inaccuracies, the sensors are very often slightly asymmetrical in terms of measurement, which means that a low flow is measured at zero flow. This asymmetry can be corrected after an initial calibration of the measurement device. Deviations from this calibration represent a separate measurement variable. However, this measurement variable can be very noisy.

SUMMARY

The object of the invention is therefore to propose a method by means of which the measured values of the measurement variable relating to deviations of the sensor asymmetry from an original state are stabilized.

In a method according to the invention for operating a Coriolis measurement device for measuring a density and/or a mass flow of a medium flowing through a pipeline, the Coriolis measurement device comprises at least one measuring tube for guiding the medium, each tube having an inlet and an outlet and a measuring tube wall enclosing a measuring tube lumen; at least one exciter for generating measuring tube vibrations, and a first sensor on the inlet side and a second sensor on the outlet side for sensing measuring tube vibrations, wherein the exciter and the sensors each have a coil device with at least one coil and a magnetic device with at least one magnet, wherein the coil device and the magnetic device of each sensor are moved relative to one another by measuring tube vibrations, during which a measured electrical voltage is induced in the coil; an electronic measuring/operating circuit for operating the exciter, for sensing and evaluating the measured electrical voltages and for outputting measured density and/or mass flow values and diagnostic information, wherein the method has the following steps:

recording the measured voltages from the sensors and creating an asymmetric sequence of values by means of the amplitudes of the measured voltages for the purpose of diagnosing the Coriolis measurement device, checking whether the asymmetric sequence of values satisfies at least one invalidity criterion, creating a stabilized asymmetric sequence of values on the basis of the asymmetric sequence of values by replacing asymmetric measured values with substitute values, wherein, as an invalidity criterion is satisfied, a last valid measured value of the asymmetric sequence of values is used as the current value of the stabilized asymmetric sequence of values, or the stabilized asymmetric sequence of values is set to a predetermined value, wherein the first invalidity criterion is based on a scattering parameter of the asymmetric sequence of values exceeding a first limit value.

In order to create the asymmetric sequence of values, a ratio of an absolute deviation of amplitudes of the measured voltages from a mean value of the amplitudes of the measured voltages can be formed.

Predetermined values as substitute values can be, for example, zero or NaN (not a number) or other values which indicate an invalidity of the asymmetric sequence of values at certain times or in certain time ranges. In this way, the electronic measuring/operating circuit can recognize whether values of the asymmetric sequence of values correspond to measured values of the asymmetry, or whether the values are to be ignored with regard to a determination of a Coriolis measurement device state, for example.

In particular in the case of a medium containing multiple medium components, possibly in different states of matter, the asymmetric sequence of values can temporarily deviate greatly from an average value and thus be distorted in a disruptive manner, and therefore a replacement of values of the asymmetric sequence of values by a last valid value or by a predetermined value provides a significantly more stable asymmetric sequence of values.

In one embodiment, a second invalidity criterion is based on a resonance frequency of the measuring tube comprising medium or a variable derived therefrom, such as a density, exceeding or falling below a second limit value.

For example, a mean value or a standard deviation of the resonance frequency or the variable derived therefrom can also be used.

For example, the second limit value can be an absolute value of a deviation of the resonance frequency from a mean value.

In one embodiment, the first invalidity criterion is evaluated in a first flexible time window.

In one embodiment, the second invalidity criterion is evaluated in a second flexible time window.

In one embodiment, the first time window has a duration of at least 0.2 seconds and in particular at least 0.5 seconds and preferably at least 1 second, and/or the first time window has a duration of at most 90 seconds and in particular at most 70 seconds and preferably at most 60 seconds.

In one embodiment, the second time window has a duration of at least 2 seconds and in particular at least 4 seconds and preferably at least 5 seconds, and/or wherein the second time window has a duration of at most 150 seconds and in particular at most 130 seconds and preferably at most 120 seconds.

In one embodiment, if the time or phase difference or a variable derived therefrom falls below a second limit value and the asymmetry exceeds a third limit value, a last valid measured value of the asymmetric sequence of values is used as the current value of the asymmetric sequence of values, or the current value of the asymmetric sequence of values is set to a predetermined value.

In this way, an asymmetry-causing partial filling of the measuring tube when the medium is stationary can be detected and rejected. The second limit value can correspond, for example, to a value of less than 5% and in particular less than 1% and preferably less than 0.1% of a maximum specified mass flow. The third limit value can be, for example, an asymmetry of at least 0.1% and in particular at least 1% and preferably at least 5%.

In one embodiment, the scatter value is determined by one of the following procedures: summing distances between adjacent measured values, summing distances of the measured values from a mean value of measured values of the stabilization variable.

In one embodiment, a distance measure A has the following relationship: $A=|p1-p2|^n$, where $n>0$, and p1 is a measured value and p2 is a measured value or a mean value.

Preferably, n is a number greater than 0.5 and at most 4. It is not ruled out here that the relationship has further terms or is modified by means of a factor.

In one embodiment, a warning is output if an amount of the stabilized asymmetric sequence of values exceeds a limit value.

BRIEF DESCRIPTION OF THE DRAWINGS

The present disclosure will now be described with reference to exemplary embodiments.

DETAILED DESCRIPTION

Figure 1:
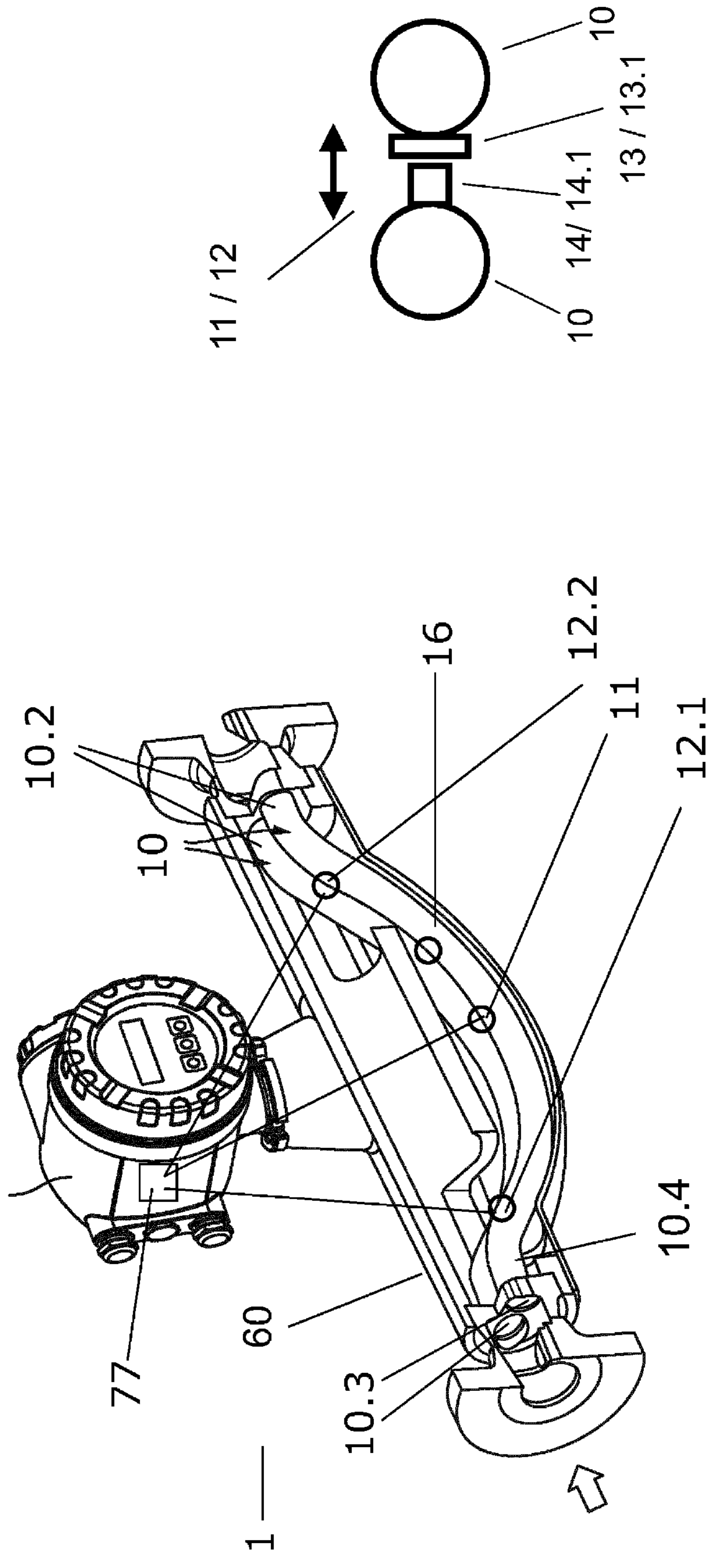
FIG. 1 describes an exemplary Coriolis measurement device.

FIG. 1 shows an exemplary Coriolis measurement device 1 for measuring a mass flow or a density of a medium flowing through a pipeline, comprising two measuring tubes 10, each having an inlet 10.1 and an outlet 10.2, wherein a measuring tube wall 10.4 encloses a measuring tube lumen 10.3. The measuring tubes are excited to vibrate by an exciter 11; a first sensor 12.1 on the inlet side and a second sensor 12.2 on the outlet side detect the measuring tube oscillations and generate measurement signals, which are evaluated by an electronic measuring/operating circuit 77 arranged in a housing 80. The measuring tubes are held by a supporting element. As shown here, the sensor and the exciter can each have a coil device 13 with a coil 13.1 and a magnetic device 14 with a magnet 14.1, wherein the coil device and the magnetic device experience relative movements as a result of measuring tube oscillations. As a result of the relative movement, electrical voltages are induced in the coil, and electrical currents are thus caused, which are processed by the electronic measuring/operating circuit. The measurement signal can be the electrical voltage or the electrical current. Since inaccuracies in production and manufacturing exist also in Coriolis measurement devices, different sensors are not exactly the same, and therefore they produce slightly different measurement signals under the same conditions, which manifests, for example, in different amplitudes of measurement signals. This asymmetry between the sensors can be used as a further measurement variable in order to be able to detect, for example, an operating state or a wear state of the Coriolis measurement device.

Coriolis measurement devices can also have only one measuring tube or more than two measuring tubes. A person skilled in the art will then adapt the exciter and the sensors accordingly. The coil device and the magnetic device can, for example, each be arranged on a measuring tube, but they can, for example, each also be fastened to the supporting element via a holding device. Coriolis measurement devices can also have more than one exciter and/or more than two sensors.

Figure 2:
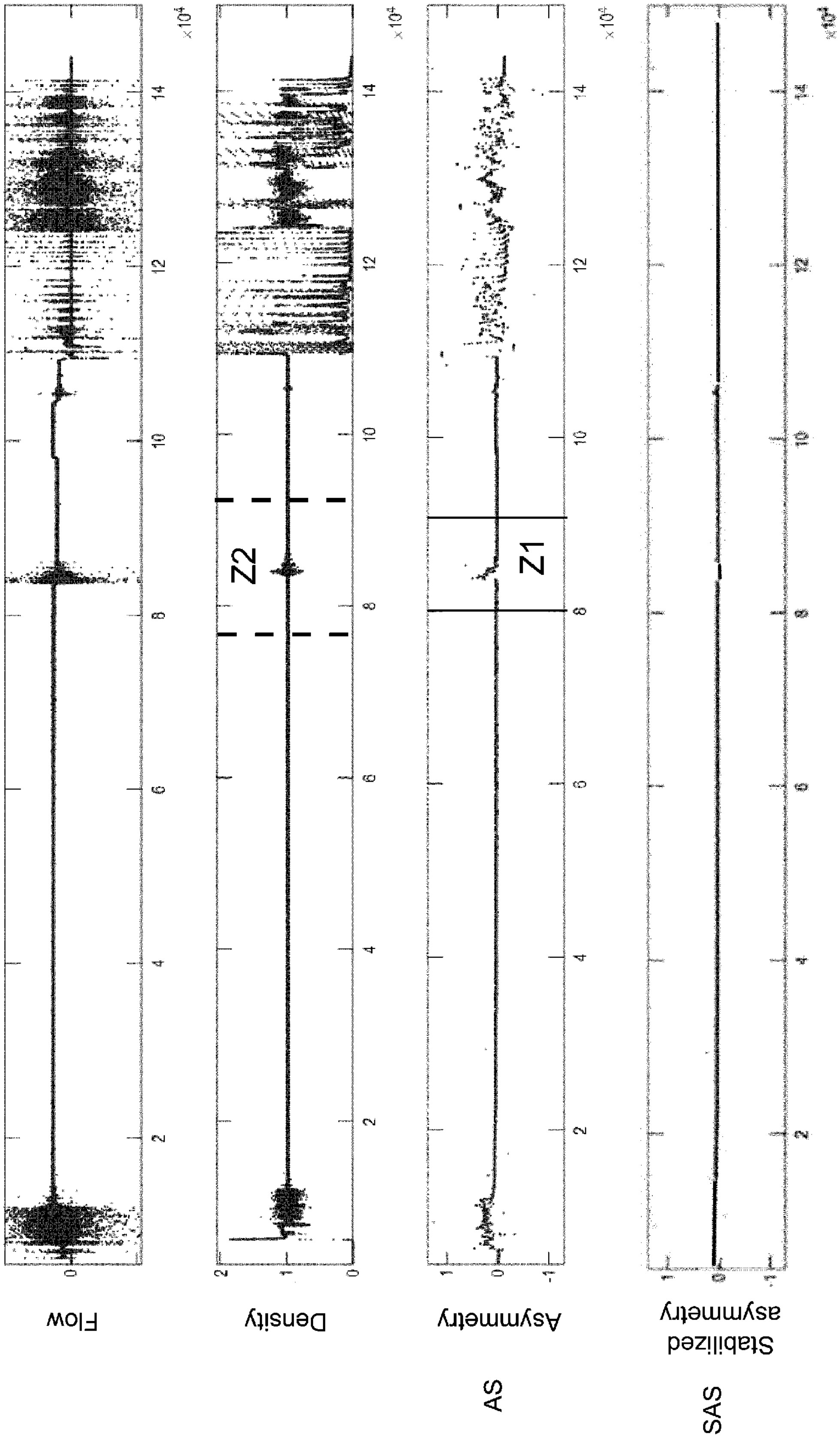
FIG. 2 shows exemplary curves of measurement signals.

FIG. 2 outlines exemplary curves of measurement signals relating to mass flow, density and asymmetry of the sensors. The scaling of the axes is given in arbitrary units and purely by way of example. In the case of homogeneous medium, the curve of measured density and measured flow is usually less variable. In the case of a medium having different immiscible or poorly miscible fractions and/or fractions with different states of matter, short-term signal fluctuations which start and stop suddenly can occur, as shown in the exemplary measurement signal curves. These are due to the fact that local fluctuations in the medium composition in the region of the sensors influence the measuring tubes in the region of the sensors in different ways. During such phases, the asymmetric sequence of values AS cannot be used.

As shown in the measurement signal curve for density and asymmetry as an example, it is possible to check within flexible time windows Z1, Z2 whether the asymmetry measurement signal satisfies a first invalidity criterion or whether a resonance frequency of the measuring tube comprising medium or a variable derived therefrom, such as a density as shown here, satisfies a second invalidity criterion.

The first invalidity criterion is based, for example, on a scattering parameter of the asymmetric sequence of values exceeding a first limit value. The second invalidity criterion is based, for example, on a resonance frequency of the measuring tube comprising medium or a variable derived therefrom, such as a density as shown here, exceeding a second limit value.

A stabilized asymmetric sequence of values SAS is created on the basis of the asymmetric sequence of values by replacing asymmetric measured values with substitute values in a third method step 103, wherein, as an invalidity criterion is satisfied, a last valid measured value of the asymmetric sequence of values is used as the current value of the stabilized asymmetric sequence of values, or the stabilized asymmetric sequence of values is set to a predetermined value, a first invalidity criterion being based on a scattering parameter of the asymmetric sequence of values exceeding a first limit value.

If the at least one invalidity criterion is not satisfied, values of the asymmetric sequence of values AS are adopted.

Figure 3:
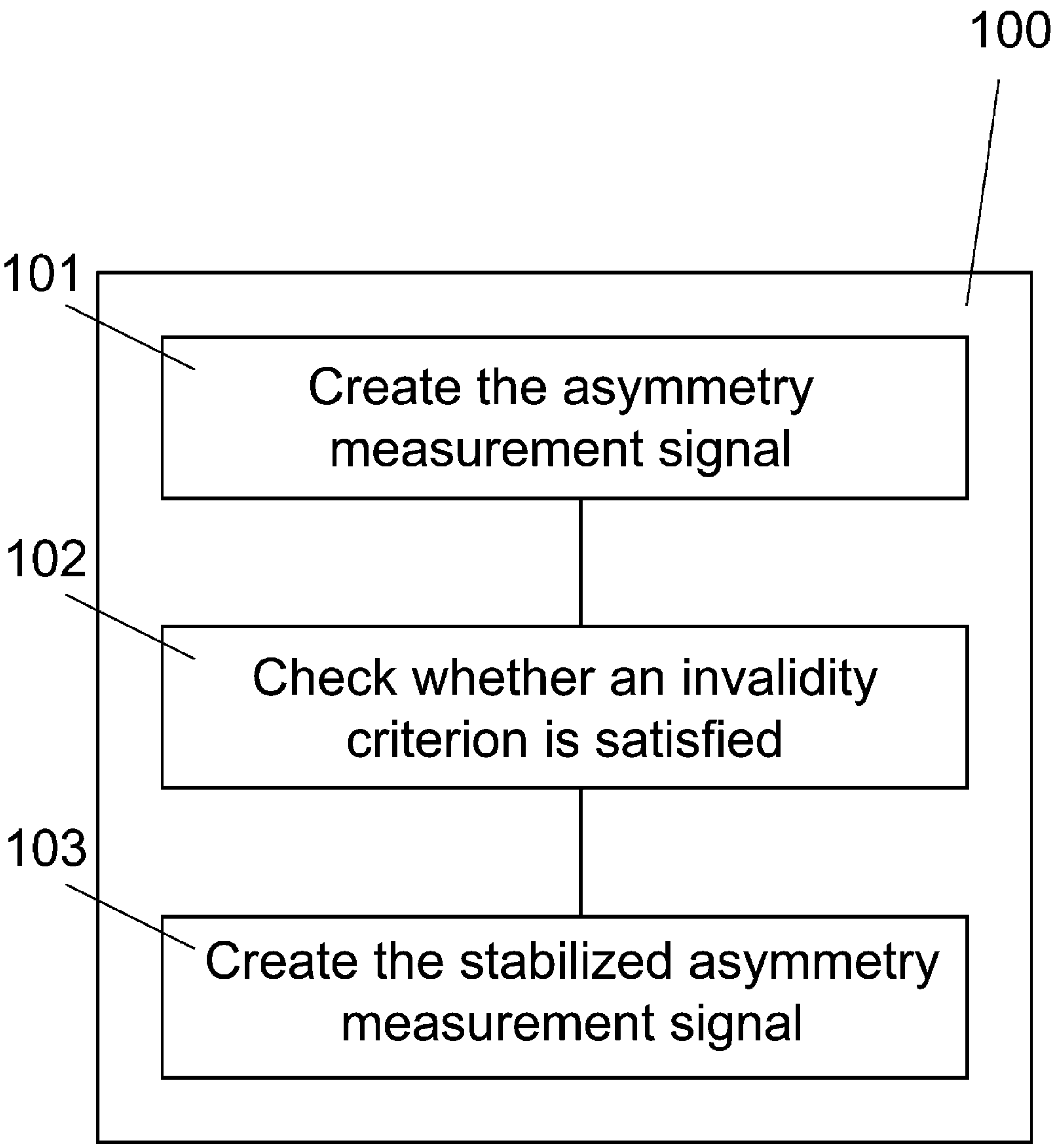
FIG. 3 illustrates the sequence of a method according to the present disclosure.

FIG. 3 describes the sequence of an exemplary method according to the invention for stabilizing the asymmetric sequence of values.

In a first method step 101, an asymmetric sequence of values AS is created from the measurement signals from the sensors 12.1 and 12.2, wherein, for example, amplitudes of the measurement signals from the sensors are used.

In a second method step 102, a check is made to see whether the asymmetric sequence of values satisfies at least one invalidity criterion.

In a third method step 103, the asymmetric sequence of values is stabilized by replacing values of the asymmetric sequence of values and an asymmetric sequence of values SAS is formed, wherein, as an invalidity criterion is satisfied, a last valid measured value of the asymmetric sequence of values is used as the current value of the stabilized asymmetric sequence of values, or the stabilized asymmetric sequence of values is set to a predetermined value.

For example, scattering of the measurement signal of the asymmetric sequence of values is determined, and if the scatter value exceeds a first limit value, a last valid measured value of the asymmetric sequence of values is used as the current value of the asymmetric measured value, or the asymmetric sequence of values is set to a predetermined value. In this way, the asymmetric sequence of values can be prepared such that, for example, it can be interpreted and processed by the electronic measuring/operating circuit in a meaningful manner. Typical values for a predetermined value are, for example, NaN (not a number), 0, or a value outside a typical value range of the asymmetric sequence of values, such as 1000. This is what stabilizing the asymmetric sequence of values means.

A sum of distances between adjacent measured values within the time window Z2 can be formed in order to calculate the scattering. A sum of distances of measured values from the mean value within the time window Z2 can also be formed in order to calculate the scattering, wherein the mean value is formed from measured values within a time window Z1.

For example, the first time window Z1 has a duration of at least 0.2 seconds and in particular at least 0.5 seconds and preferably at least 1 second, and/or wherein the first time window has a duration of at most 90 seconds and in particular at most 70 seconds and preferably at most 60 seconds. For example, the second time window Z2 has a duration of at least 2 seconds and in particular at least 4 seconds and preferably at least 5 seconds, and/or wherein the second time window has a duration of at most 150 seconds and in particular at most 130 seconds and preferably at most 120 seconds. It is not ruled out that the first time window and the second time window are identical.

The following relationship can be used as the distance measure A: $A=|p1-p2|^n$ where $n>0$, and p1 as the measured value and p2 as the measured value or a mean value.

Another reason for invalid measured values of the asymmetric sequence of values can be only partial filling of the at least one measuring tube of the Coriolis measurement device. In this case, the amplitudes of the measurement signals from the sensors can deviate greatly from one another. An only partial filling can take place, for example, if the at least one measuring tube is oriented vertically, when a liquid level of the measuring tube falls to a level between the first sensor and the second sensor due to lack of flow. This can be detected by checking the time or phase difference or a variable derived therefrom and the asymmetric sequence of values.

If the time or phase difference or a variable derived therefrom falls below a second limit value, and the asymmetry exceeds a third limit value, then a partial filling is detected, and a last valid measured value of the asymmetric sequence of values is used as the current value of the asymmetric sequence of values, or the asymmetric sequence of values is set to a predetermined value.

The invention claimed is:

1. A method for operating a Coriolis measurement device for measuring a density and/or a mass flow of a medium flowing through a pipeline, the method comprising:

providing the Coriolis measurement device, including:
- a measuring tube for guiding the medium, the measuring tube having an inlet, an outlet, and a measuring tube wall enclosing a measuring tube lumen;
- an exciter for generating measuring tube vibrations;
- a first sensor on the inlet side and a second sensor on the outlet side for sensing measuring tube vibrations, wherein the exciter and the sensors each has a coil device with a coil and a magnetic device with a magnet, and wherein the coil device and the magnetic device of each sensor are moved relative to one another by measuring tube vibrations during which a measured electrical voltage is induced in the respective coil; and
- an electronic measuring/operating circuit for operating the exciter, for sensing and evaluating the measured electrical voltages from the sensors, and for outputting measured values of density and/or mass flow and diagnostic information;

recording the measured voltages from the sensors and creating an asymmetric sequence of values using amplitudes of the measured voltages for the purpose of diagnosing the Coriolis measurement device;

checking whether the asymmetric sequence of values satisfies at least one invalidity criterion; and creating a stabilized asymmetric sequence of values on the basis of the asymmetric sequence of values by replacing asymmetric measured values with substitute values, wherein, as an invalidity criterion is satisfied, a last valid measured value of the asymmetric sequence of values is used as the current value of the stabilized asymmetric sequence of values, or the stabilized asymmetric sequence of values is set to a predetermined value, wherein the first invalidity criterion is based on a scattering parameter of the asymmetric sequence of values exceeding a first limit value.

2. The method according to claim 1, wherein a second invalidity criterion is based on a resonance frequency of the measuring tube comprising medium or a variable derived therefrom exceeding or falling below a second limit value.

3. The method according to claim 2, wherein the second invalidity criterion is evaluated in a second flexible time window.

4. The method according to claim 3, wherein the second time window has a duration of at least 2 seconds, and/or wherein the second time window has a duration of at most 150 seconds.

5. The method according to claim 1, wherein the scattering parameter is a standard deviation or a variance.

6. The method according to claim 1, wherein the first invalidity criterion is evaluated in a first flexible time window.

7. The method according to claim 6, wherein the first time window has a duration of at least 0.2 seconds, and/or wherein the first time window has a duration of at most 90 seconds.

8. The method according to claim 1, wherein, if the time or phase difference or a variable derived therefrom falls below a second limit value and the asymmetry exceeds a third limit value, a last valid measured value of the asymmetric sequence of values is used as the current value of the asymmetric sequence of values, or the asymmetric sequence of values is set to a predetermined value.

9. The method according to claim 8, wherein a warning is output if an amount of the stabilized asymmetric sequence of values exceeds a fourth limit value.

10. The method according to claim 1, wherein measured values for scattering or standard deviation is determined by one of the following procedures:

adding up distances between adjacent measured values of the asymmetric sequence of values, and adding up distances between the measured values of the asymmetric sequence of values to get a mean value of measured values of the asymmetric sequence of values.

11. The method according to claim 10, wherein a distance measure A has the following relationship:

$A=|p1-p2|^n$, where $n>0$, p1 is a measured value, and p2 is a measured value or a mean value.

* * * * *